March 22, 1938. W. A. MARRISON 2,111,598
FREQUENCY INDICATING AND CONTROLLING APPARATUS
Filed Jan. 26, 1935
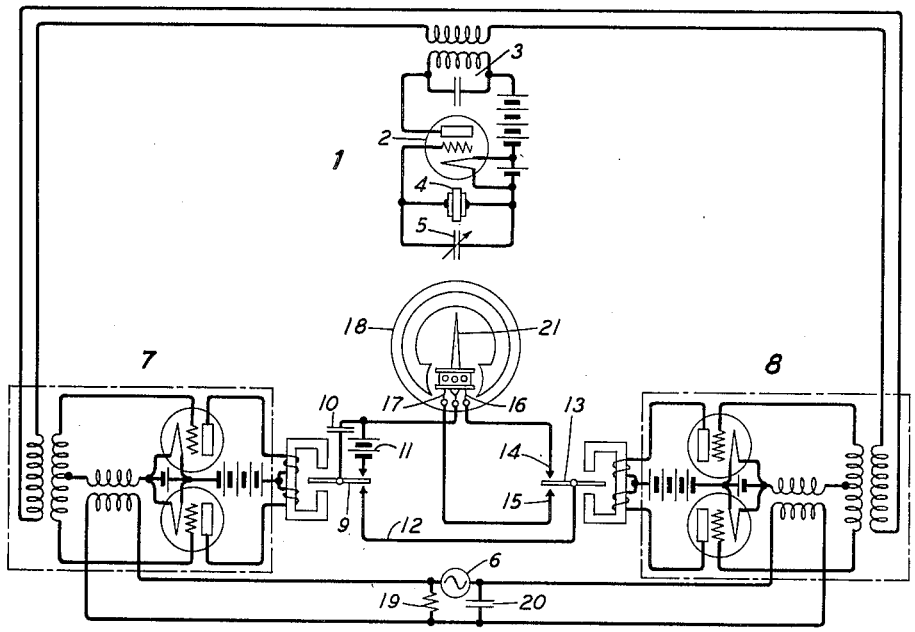
FIG. 1
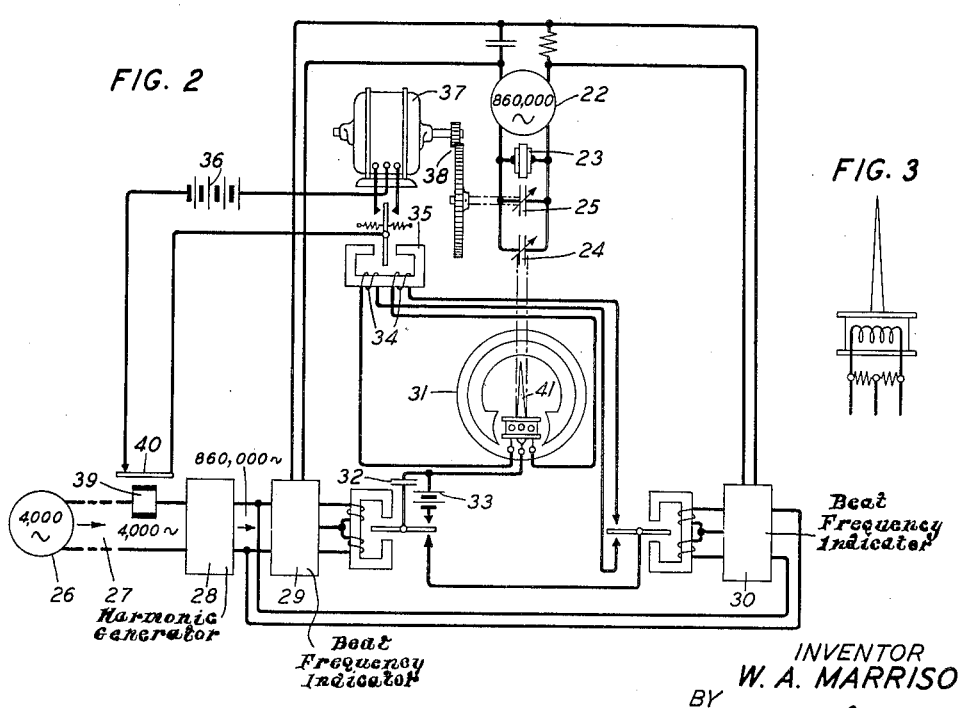
FIG. 2
FIG. 3
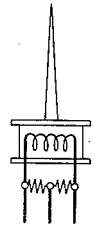
INVENTOR
W. A. MARRISON
BY
E. V. Griggs
ATTORNEY Patented Mar. 22, 1938

2,111,598

UNITED STATES PATENT OFFICE 2,111,598

FREQUENCY INDICATING AND CONTROLLING APPARATUS

Warren A. Marrison, Maplewood, N. J., assignor to Bell Telephone Laboratories, Incorporated, New York, N. Y., a corporation of New York Application January 26, 1935, Serial No. 3,675

6 Claims. (Cl. 250—36)

This invention relates to apparatus for indicating and controlling the relative frequencies of two sources of oscillations.

An object of the invention is to indicate which of two oscillation frequencies is the higher and the amount by which the two differ.

Another object of the invention is to enable one oscillator to automatically control the oscillation frequency of a second oscillator irrespective of whether the tendency of the controlled oscillation frequency is to increase or decrease.

In accordance with the invention, oscillations of two different frequencies are caused to interact to produce beats or difference frequency pulses. A second set of beats is produced from the same oscillations after shifting the phase of one of the oscillations by 90°. The two sets of beats are then utilized to control discharge of a condenser through the windings of a two-winding indicator, one set of beats determining the number of discharges of the condenser in a given time and consequently the magnitude of the indicator reading and the other set of beats determining to which winding of the indicator the discharge currents are supplied thus determining the sense of the indicator reading. It is accordingly possible to ascertain the frequency difference and to determine which of the two oscillation sources is of the higher frequency directly from the indicator reading. Since the indicator responds in both sense and magnitude to the differences in frequency of the two sets of oscillations it may be used to control the frequency of one set of oscillations so as to bring it to equality with the frequency of the other set.

Other features and objects of the invention will be apparent from the appended specification taken in connection with the drawing in which:

Fig. 1 shows a system for indicating the sense and magnitude of the difference between two oscillation frequencies;

Fig. 2 shows a system for controlling the frequency of a local oscillator by harmonics of control oscillations transmitted from a remote point; and Fig. 3 illustrates a modification of a meter or relay of the circuits of Figs. 1 and 2.

An oscillator 1 comprises a thermionic discharge device 2 having a cathode, an anode and an impedance control element, a tuned output circuit 3, an input circuit including a piezoelectric crystal 4 for determining the frequency of the oscillator, and a variable condenser 5 in shunt thereto to enable small changes in the frequency of the oscillations produced to be made in well known manner. An oscillator 6, the frequency of the oscillations of which is to be compared with the frequency of the oscillations of oscillator 1, may be of the same type as oscillator 1, or of any other variable type. Oscillators 1 and 6 are each connected to supply oscillations to two combining devices 7 and 8, each of which may be of the type indicated at M, in United States Patent 1,450,966, issued April 10, 1923 to H. A. Affel. The characteristic of these combining devices 7 and 8 is such that they produce in their output circuits which include the windings of differentially wound electromagnetic relays, actuating currents which cause the armatures to operate alternately between their two contacts at a frequency corresponding to the beat or difference frequency of the two sets of impressed oscillations. The armature 9 of combining device 7 is connected to a condenser 10 which has a terminal in common with a charging current source 11. One contact of device 7 with which armature 9 is adapted to engage is also connected to the source 11 in such a manner that upon engagement with that contact by the armature the source imparts a charge to condenser 10. When armature 9 engages its alternate contact condenser 10 is permitted to discharge. The discharge path for condenser 10 extends by way of conductor 12 to armature 13 of combining device 8. Associated with armature 13 are contacts 14 and 15, respectively, connected to windings 16 and 17 of a two-winding indicator or meter 18. It will therefore be evident that the combining device 7 and its associated electromagnetic relay serves to determine the number of times that condenser 10 is charged and discharged and combining device 8 with its associated electromagnetic relay determines through which of the windings 16 and 17 the discharge current from condenser 10 is to pass.

In a series path connected to the source 6 are a non-inductive resistance 19 and a capacitive element 20. Oscillations from the source 6 are supplied to combining device 7 from the terminals of resistance 19 and to combining device 8 from the terminals of capacity element 20. It follows that the electromotive forces applied to the two combining devices differ in phase by 90°. Accordingly, the beat or impulse currents produced in combining device 7 do not coincide in phase with those produced by combining device 8 but differ therefrom in phase by 90°. In operation, the combining device will cause armature 9 to operate at the beat frequency which is the frequency difference between the frequencies of sources 1 and 6 and will therefore deliver to indicator 18 a series of recurring discharge currents so that the integrated current through the indicator will be proportional to the frequency of vibration of the armature 9. The needle 21 of indicator 18 will accordingly be deflected by an amount proportional to the difference frequency. The scale with which the needle is associated may be calibrated directly in terms of difference frequency. The combining device 8 in conjunction with its armature 13 determines whether the discharge currents traverse winding 16 or winding 17 of the indicator and accordingly determines the sense of the indication. If the frequency of the oscillations produced by the source 1 is higher than the frequency of the oscillations produced by the source 6 one phase relationship will subsist between the positions of armatures 9 and 13 and accordingly the needle 21 will be deflected in one direction. If either or both of the frequencies of the sources 1 and 6 should change so that the frequency of 6 became greater than the frequency of 1, the relative phases of armatures 9 and 13 in their respective cycles of operation would shift by 180°. In other words, the one which had previously been 90° ahead would fall 90° behind. It is accordingly possible to tell directly from the position of the needle of indicator 18 whether the frequency of oscillator 1 is higher than the frequency of oscillator 6 or vice versa.

As has previously been explained, the frequency of oscillator 1 is held substantially constant by any suitable device, as for example, piezoelectric element 4. It is possible, however, to increase or decrease the frequency to some extent by variation of the capacity of variable capacity element 5. This may, of course, be done manually by so manipulating condenser 5 as to cause the needle 21 to remain in its central or zero position thus indicating that the frequencies of oscillators 1 and 6 are the same.

The same result may be accomplished automatically by providing a mechanical linkage connecting the moving element of condenser 5 with the moving element of indicator 18. Any variation of the frequency of either oscillator with respect to the frequency of the other tending to produce a difference frequency would be followed by a tendency of needle 21 to move in one direction or the other thus making the appropriate adjustments in the capacity of condenser 5 to cause the frequency of oscillator 1 to be the same as that of the oscillator 6.

It will, of course, be understood that in lieu of the oscillator 6 any other source of oscillations as, for example, a radio receiver or a transmission line over which oscillations are being received may be connected.

In the system of Fig. 2 a local source 22 of high frequency oscillation is provided with three frequency control elements, namely, a piezoelectric element 23, a variable condenser 24 and a variable condenser 25. A source 26 of constant low frequency oscillations located at a remote point is connected by means of transmission line 27 with the harmonic generator 28. Assuming that the frequency of the oscillations produced by local source 22 is 860,000 cycles and the frequency of the remote source is 4000 cycles, the harmonic generator 28 is designed to receive oscillations of 4000 cycles and to produce output oscillations of 860,000 cycles. Combining devices 29 and 30, similar in all respects to devices 7 and 8 of Fig. 1, receive controlling oscillations of 860,000 cycles from the harmonic generator 28 and oscillations from the controlled source 22. A differentially wound relay 31, corresponding to meter 18 of Fig. 1, is actuated by charges received from a condenser 32 which is alternately charged from source 33 and discharged through the relay 31. Meter 31 actuates an element 41 corresponding to the needle 21 of Fig. 1 which is mechanically linked to the operating mechanism of variable condenser 24 in such fashion as to reduce the beat frequency between the output oscillations of harmonic generator 28 and the oscillations supplied by source 22 to zero. In series with the meter 31 are two windings 34 of a differentially wound neutral or three-position relay 35 which operates to connect source 36 to one of the current supply contacts of the motor 37. Actuation of the armature of relay 35 in one direction causes motor 37 to revolve in one direction and alternate operation of the armature of relay 35 causes motor 37 to operate in the opposite direction. Motor 37 is associated with a reducing gear mechanism 38 mechanically connected to the operating shaft of variable condenser 25. Accordingly, actuation of relay 35 causes motor 37 to readjust the magnitude of the capacity of element 25 and accordingly to change the frequency of local source 22. If the frequency of the local source 22 differs from that of the oscillations supplied by the harmonic generator 28 to the combining device or beat frequency indicator 29, the relay 34 controls reversible motor M to restore the frequency of the source 22 to the correct magnitude, namely, to equality with the frequency of the output oscillations from harmonic generator 28. In the meantime, the capacity element 24 is also undergoing adjustment to accomplish the same result. After a short time the capacity element 24 reaches a neutral position and no further control is effected by the reversible motor. This is because the meter current is zero on the average when the zero beat condition is obtained.

Since relay 35 is a two-position relay, it is constantly tending to correct the frequency of source 22 in one direction or the other. In the event that the supply of control oscillations from the remote source should be interrupted by failure of the line or otherwise, relay 39 in series with the line 27 will be deenergized permitting its armature 40 to fall back and open the circuit of motor 37 thus preventing further operation of the motor until the current in line 27 is restored.

In lieu of the two-winding actuating elements of meter 18 and of relay 31 a single winding element shunted by a resistance element with a mid-tap connection, as illustrated in Fig. 3, may be employed.

What is claimed is:

1. In combination, a source of standard frequency oscillations, a source of controllable frequency oscillations, means for varying the frequency of the controllable source to hold it in a definite frequency relationship with respect to the standard source comprising a relay having a three-position armature, means connected to the relay and responsive to the conjoint action of the two sources for causing the relay armature to assume either of two of its three positions according as the standard source is of higher or lower frequency respectively, means controlled by the armature of the relay in the two positions to vary the frequency of the controllable oscillator in a direction determined by the position of the armature, means causing the armature to assume a neutral or intermediate position when the frequencies of the source differ only slightly, and an additional means for varying the frequency of the controllable oscillator which is continuously operative in response to any departure of the frequency of the controllable oscillator from the desired relationship to enable slight corrections of the frequency to be made when the relay armature of the first frequency-correcting means is in its neutral position.

2. In combination, two electric oscillators of electric discharge type, means connected to the two oscillators to maintain a definite relationship between their frequencies, said means being responsive to the conjoint action of the two oscillators whenever the frequency relationship deviates from that desired by more than a small value and a second means connected to both oscillators and conjointly responsive to them at all times so as to tend to maintain a desired relationship when the deviation therefrom is less than that required to actuate the first means.

3. A source of oscillations, a second source of oscillations, means for combining oscillations received from said sources to produce beat frequency oscillations, means for shifting the phase of the oscillations from one of said sources by substantially 90° and for combining the oscillations of shifted phase with oscillations from the other source to produce a second set of beat frequency oscillations, and means including an indicator controlled conjointly by said two sets of beat frequency oscillations to directly indicate the magnitude of the difference in frequency of said sources of oscillations and also which frequency is the greater by the position of said indicator.

4. In combination, a relay having an operating winding, an armature and a pair of contacts associated therewith, a condenser having one terminal connected to the armature, a source of charging current connected between the other terminal of the condenser and one of the contacts whereby operation of the armature to said one contact causes the condenser to be discharged, a discharge circuit connected between the other contact and the common terminal of the condenser and charging source, said discharge circuit including in series an indicator to respond to the magnitude and polarity of the current discharged therethrough and a reversing relay which operates to cause the discharge current to traverse the indicator in one direction or the other in accordance with the condition of operation of the reversing relay.

5. In combination, a condenser and a source of charging current having one terminal of each in common, a charging relay comprising an operating winding, an armature connected to the other terminal of said condenser and two cooperating contacts, one connected to the other terminal of said source and the other contact connected to a discharge conductor whereby operation of said relay and its armature first charges the condenser from the source and then discharges the condenser, an indicator having two opposed windings, each connected to the common terminal of the condenser, a reversing relay having an operating winding, an armature connected to the discharge conductor and contacts respectively connected to the opposing windings of the indicator whereby the phase of the armature of the reversing relay with respect to that of the armature of the charging relay determines which of the opposing windings receives the predominating portion of the discharge current.

6. The method of indicating the direction and extent of the difference in frequency of two sets of oscillations to be compared which comprises causing oscillations of one set to undergo a phase shift, separately combining the shifted phase oscillations and the unshifted phase oscillations of the same set with oscillations of the other set to produce two sets of beat frequency oscillations differing in phase, utilizing the two sets of beat frequency oscillations to control the production of unidirectional impulses having a magnitude determined by the frequency difference and a direction determined by the higher frequency of the original sets of oscillations to be compared and causing said impulses to produce an indication of their magnitude and direction.

WARREN A. MARRISON.